(12) United States Patent
Belshe et al.

(10) Patent No.: US 11,120,438 B1
(45) Date of Patent: Sep. 14, 2021

(54) CRYPTOCURRENCY ADDRESS SECURITY

(71) Applicant: BITGO, INC., San Francisco, CA (US)

(72) Inventors: Michael A. Belshe, San Francisco, CA (US); Joseph William Lee, San Francisco, CA (US)

(73) Assignee: BITGO, INC., San Francisco, CA (US)

( * ) Notice: Subject to any disclaimer, the term of this patent is extended or adjusted under 35 U.S.C. 154(b) by 0 days.

(21) Appl. No.: 16/221,038

(22) Filed: Dec. 14, 2018

Related U.S. Application Data

(63) Continuation of application No. 15/468,018, filed on Mar. 23, 2017, now abandoned, which is a continuation of application No. 14/172,589, filed on Feb. 4, 2014, now abandoned.

(60) Provisional application No. 61/879,811, filed on Sep. 19, 2013, provisional application No. 61/898,282, filed on Oct. 31, 2013.

(51) Int. Cl.
*G06Q 20/38* (2012.01)
*G06Q 20/40* (2012.01)
*G06Q 20/06* (2012.01)
*H04L 29/06* (2006.01)
*H04L 9/32* (2006.01)

(52) U.S. Cl.
CPC ....... *G06Q 20/3829* (2013.01); *G06Q 20/065* (2013.01); *G06Q 20/401* (2013.01); *H04L 9/3242* (2013.01); *H04L 9/3247* (2013.01); *H04L 63/0435* (2013.01); *H04L 63/0442* (2013.01); *H04L 63/061* (2013.01); *H04L 63/0807* (2013.01)

(58) Field of Classification Search
None
See application file for complete search history.

(56) References Cited

U.S. PATENT DOCUMENTS

| 6,292,895 | B1* | 9/2001 | Baltzley | G06F 21/00 380/255 |
| 7,869,593 | B2 | 1/2011 | Beeson | |
| 8,788,811 | B2 | 7/2014 | Fu | |
| 10,068,228 | B1 | 9/2018 | Winklevoss | |
| 2002/0095569 | A1* | 7/2002 | Jerdonek | H04L 9/3247 713/155 |

(Continued)

FOREIGN PATENT DOCUMENTS

EP    2747333 A1 *  6/2014    ......... H04L 63/0428

OTHER PUBLICATIONS

Bitcoin Stack Exchange ("https://bitcoin.stackexchange.com/questions/9678/what-is-script-hash-address-exactly-and-how-does-it-work"; published Apr. 13, 2013) (Year: 2013).*

(Continued)

*Primary Examiner* — Patrick McAtee
*Assistant Examiner* — Jason B Fenstermacher
(74) *Attorney, Agent, or Firm* — Schwabe Williamson & Wyatt

(57) ABSTRACT

In an example, a network device is configured to generate a first public-private key pair. The network device is configured to receive, over an electronic network, public keys of two or more second public-private key pairs. The network device is configured to generate a digital currency address using the public keys of the two or more second public-private key pairs and a public key of the first public-private key pair.

20 Claims, 11 Drawing Sheets

(56) References Cited

U.S. PATENT DOCUMENTS

| | | | |
|---|---|---|---|
| 2006/0253704 A1* | 11/2006 | Kempf | H04L 29/12801 |
| | | | 713/158 |
| 2009/0235339 A1 | 9/2009 | Mennes | |
| 2013/0166455 A1 | 6/2013 | Feigelson | |
| 2014/0022586 A1* | 1/2014 | Zehler | G06F 21/608 |
| | | | 358/1.14 |
| 2014/0164251 A1* | 6/2014 | Loh | G06Q 20/065 |
| | | | 705/67 |
| 2015/0120569 A1 | 4/2015 | Belshe | |

OTHER PUBLICATIONS

Skudnov ("Bitcoin Clients", published Mar. 6, 2012) (Year: 2012).*
Bitcoin Wiki ("https://en.bitcoin.it/wiki/Contracts"; available May 13, 2012) (Year: 2012).*
Bitcoin Stack Exchange (https://bitcoin.stackexchange.com/questions/6100/how-will-multisig-addresses-work; available Aug. 30, 2012) (Year: 2012).*
Andresen, Gavin, "Pay To Script Hash"; BIP-0016.mediawiki, New "Standard" Transaction Type for the Bitcoin scripting systems, downloaded from the Internet at <https://github.com/bitcoin/bips/blob/master/bip-0016.mediawiki>; created/published Jan. 1, 2012; 7 pages.
Non-Final Office Action U.S. Appl. No. 15/468,018 dated Dec. 18, 2019; 33 pages.
Final Office Action U.S. Appl. No. 15/468,018 dated Oct. 1, 2020; 37 pages.

* cited by examiner

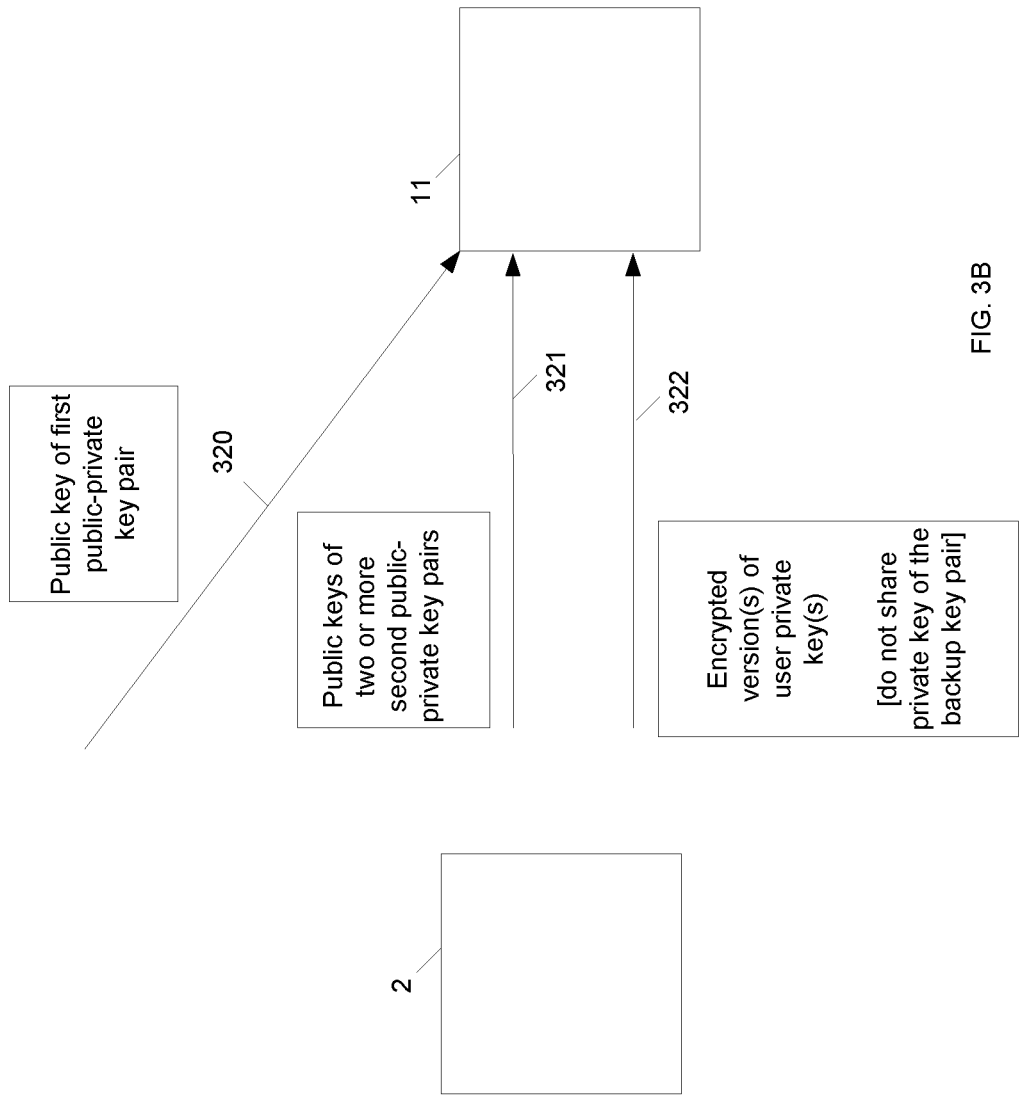

Receiver's private account
(first account number)
from k1, k2, k3

To receiver from first sender
(second account number)
from k1, k2, k4

To receiver from second sender
(third account number)
from k1, k2, k5

FIG. 6

CRYPTOCURRENCY ADDRESS SECURITY

PRIORITY

This application is a continuation of U.S. Non-Provisional patent application Ser. No. 15/468,018, filed on Mar. 23, 2017, which is a continuation of U.S. Non-Provisional patent application Ser. No. 14/172,589, filed on Feb. 4, 2014, which claims benefit of U.S. Provisional Application No. 61/879,811 filed on Sep. 19, 2013, entitled: P2SH SAFE ADDRESS and U.S. Provisional Application No. 61/898,282 filed Oct. 31, 2013, entitled: SECURE, OFFLINE ACCOUNT CREATION FOR A 3RD PARTY, each of which is herein incorporated by reference in its entirety.

COPYRIGHT NOTICE

© 2013-2017 Bitgo, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

BACKGROUND OF THE INVENTION

Digital currency or cryptocurrency addresses (where your digital currency or cryptocurrency is stored) include Bitcoin addresses. Bitcoin addresses are secured today using public key cryptography and the Elliptic Curve Digital Signature Algorithm (ECDSA). This offers reasonable security. But the secret keys used within ECDSA are lengthy 256 numbers—not conducive to memorization, meaning that they key is typically stored on a tangible medium. The security of your bitcoin hinges on how safely you can protect this key stored on a tangible medium from others. To help us protect and manage our keys, users employ bitcoin wallets. There are many wallets available to choose from, and each offers its unique benefits for ease of use, security, and features.

Wallets can be divided into two basic categories: Client-side Wallets and Web Wallets. Client side Wallets, such as the original Satoshi Client, run locally on the user's computer. Web wallets are hosted on a web site and require no custom software installation from the user.

The advantage of a client side wallet is that your bitcoin keys are entirely under your own control. No intermediaries are required to help you transact. The disadvantage of the client side wallet is that the security is entirely your own. In effect, you are the guard of your own bank. As such, you need to: prevent malware and viruses from stealing your keys; maintain and update proper backups of your keys; and enforce physical security of the computer(s) containing the keys (e.g. locked with an encrypted hard disk).

Transacting with your bitcoins from multiple computers can be difficult, as it requires you to transfer the keys safely between multiple computers. Further, because most users take extra precautions with their passwords for their bitcoin cash, forgetting or losing unusually 'strong' passwords becomes a real threat of loss.

Web Wallets have the advantage that they are accessible through the web, from anywhere. The web site hosting your wallet needs to be a trusted party, as they often require direct access to your keys, or they may hold your keys while you don't have them at all. Assuming that the website does a good job managing the security of your keys, this can be an advantage, as you don't need to do it yourself. However, a web site holding many keys for millions of users is a very obvious target for attackers. If the web site is hacked, you will lose your bitcoin. Similarly, if the website is shutdown due to improper regulatory compliance, you will lose your bitcoin as well.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In an example, a network device is configured to obtain a first public-private key pair. The network device is configured to receive, over an electronic network, public keys of two or more second public-private key pairs. The network device is configured to generate a digital currency address using the public keys of the two or more second public-private key pairs and a public key of the first public-private key pair.

Additional aspects and advantages of this invention will be apparent from the following detailed description of example embodiments, which proceeds with reference to the accompanying drawings.

BRIEF DESCRIPTION OF THE DRAWINGS

FIG. 3B illustrates the remote device causing selected keys to be shared with the network device.

FIG. 6 illustrates key rotation.

DETAILED DESCRIPTION OF EXAMPLE EMBODIMENTS

Figure 1:
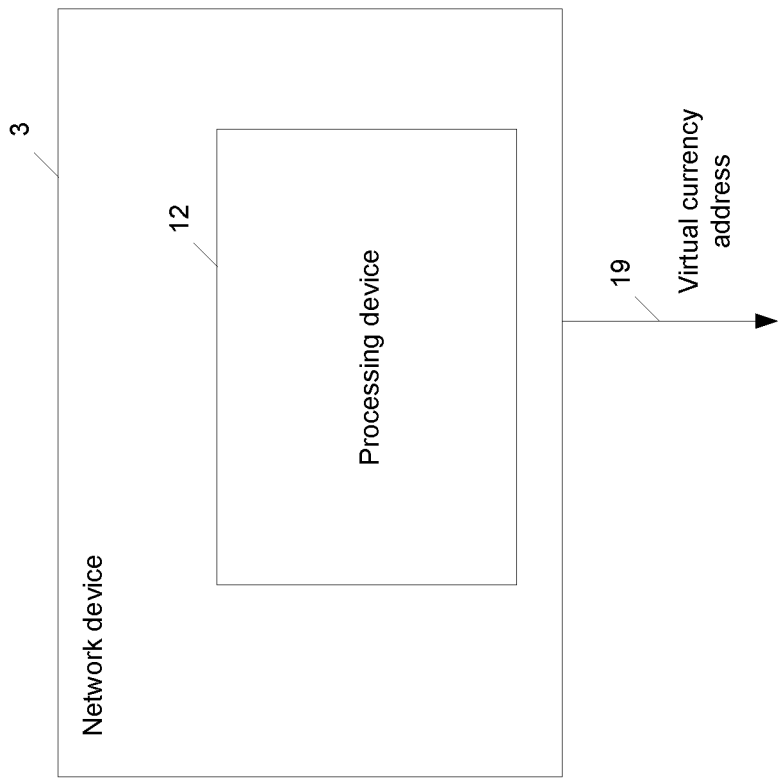
FIG. 1 illustrates a system for digital currency address security.
Figure 1:
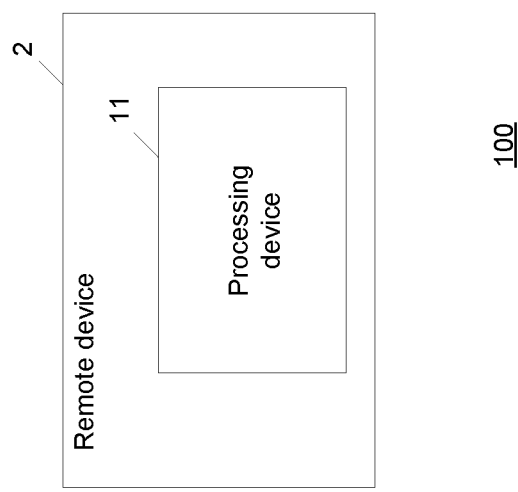

FIG. 1 illustrates a system for digital currency address security.

The system 100 includes a network device 3 and a remote device 2. The remote device 2 includes a processing device 11 configured to obtain two or more public-private key pairs. The network device 3 includes a processing device 12 configured to generate a digital currency address 19 using three or more public keys responsive to receiving the public keys of the two or more public-private key pairs.

Figure 2A:
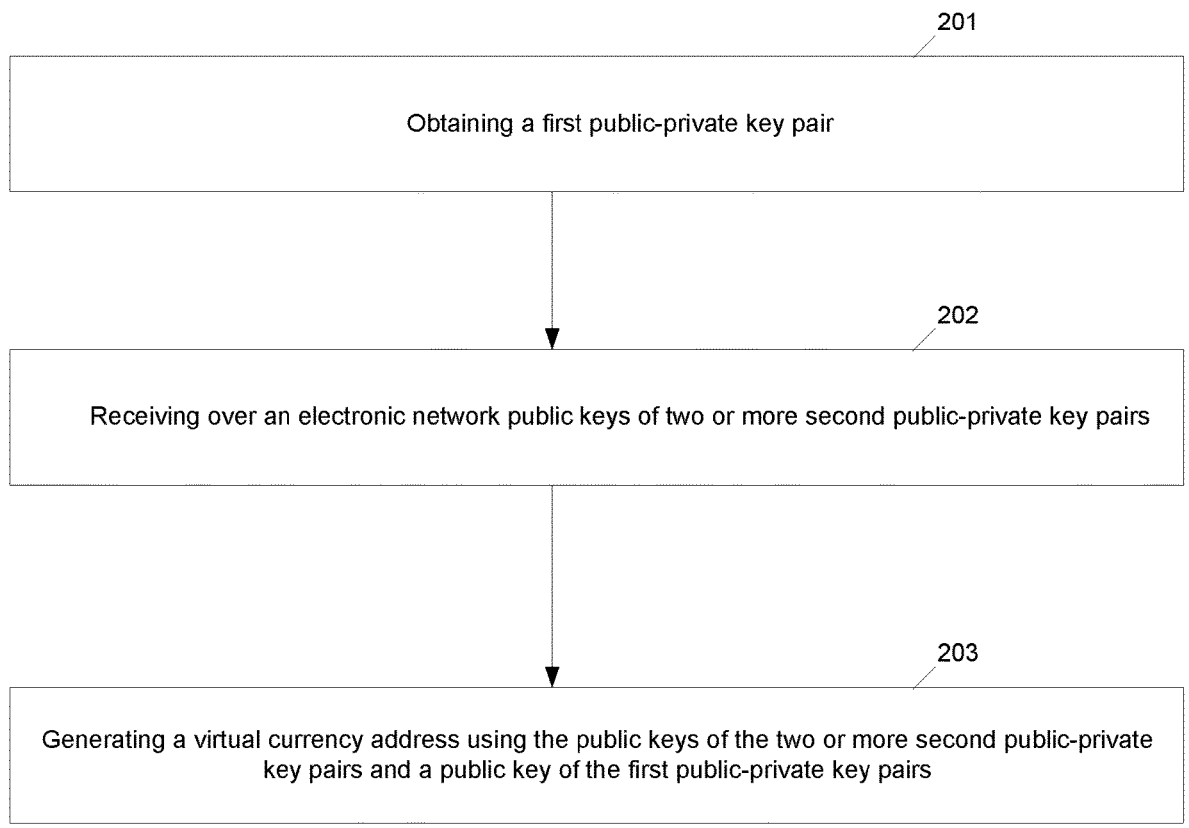
FIG. 2A illustrates a flow chart showing operation of processing device 12 of FIG. 1 to generate a digital currency address.

FIG. 2A illustrates a flow chart showing operation of processing device 12 of FIG. 1 to generate a digital currency address.

In block 201, processing device 12 may obtain a first public-private key pair. For example, processing device 12 may generate the first public-private key pair, cause a first public-private key to be generated, identify an existing public key, identify an existing private key, or the like. Block 201 may be associated with generating a public-private key pair, identifying an existing public key, identifying an existing private key (a private may implicitly identify a corresponding public key), or the like, or combinations thereof. In an example, processing device 12 may be configured to encrypt the private key of the first public-private key pair using a secure token, e.g. a first password, a PIN, a biometric, or the like, and cause the encrypted version to be stored remotely from device 2. In an example, the processing device 12 may be configured to share the public key of the first public-private key pair with the device 2.

In block 202, processing device 12 may receive over an electronic network public keys of two or more second public-private key pairs. In an example, processing device 12 may be configured to receive an encrypted version of a subset of the private keys of the two or more second public-private key pairs (the encrypted version is encrypted using an authentication criterion, e.g. a second password that is different than the first secure token, a biometric, or the like). The processing device 12 may be configured to store the encrypted version for retrieval responsive to a withdrawal request. In an example, one of the received two or more second public-private key pairs is generated by a different electronic device than a different one of the two or more second public-private key pairs.

In block 203, processing device 12 may generate a digital currency address using the public keys of the two or more second public-private key pairs and a public key of the first public-private key pair. In an example, processing device 12 may be configured to generate the digital currency address by inputting the public keys into the Pay To Script Hash (P2SH).

In an example, the two or more public private key pairs include a backup key and two or more user private keys. The user may share one of the user private keys with a third party, such as a family member or business partner. The user could set the service to approve and sign transactions up to a first amount when a first portion of the user private keys is used to sign a transaction. The user could set the service to approve and sign transactions exceeding the first amount when a second different portion of the user private keys is used to sign the transaction. In an example, the first portion is any one of the private keys, and the second portion is more than one of the user private keys. In an example, the first amount may be set to zero (so that the second portion is required to withdrawn any funds).

Figure 2B:
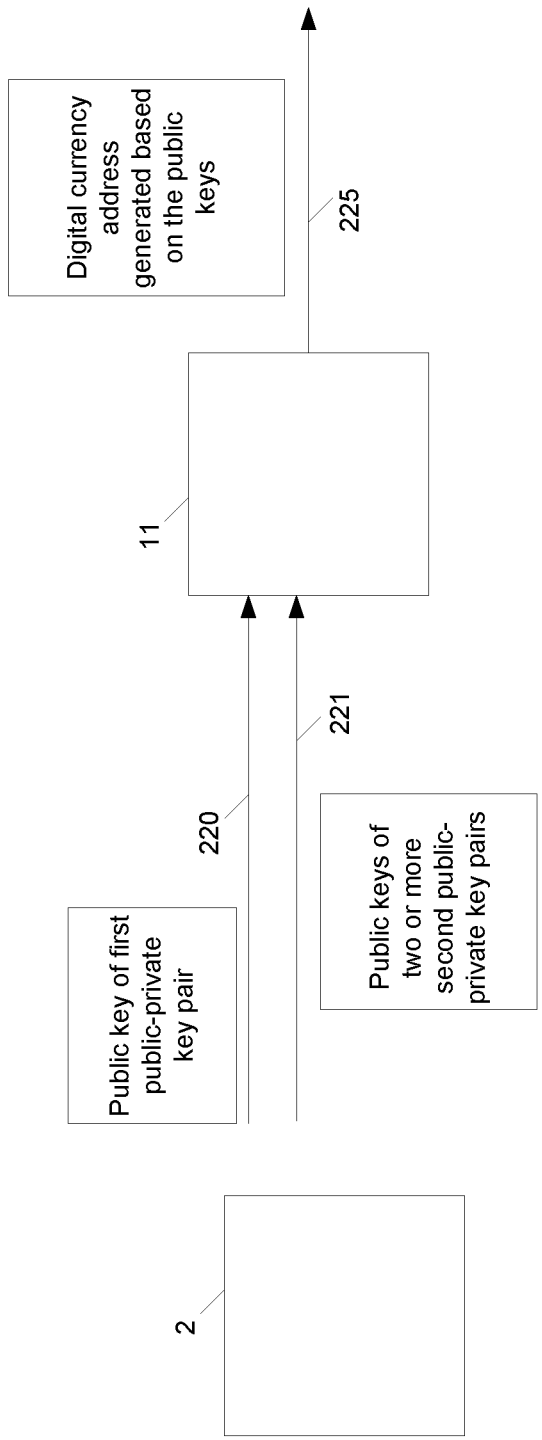
FIG. 2B illustrates the network device generating a digital currency address based on received public keys.

FIG. 2B illustrates the network device generating a digital currency address based on received public keys.

The remote device 2 may cause the public key of the first public-private key pair to be shared 220 with the network device 3. The network device 3 may obtain 221 public keys of two or more second public-private key pairs. The network device 3 may output 225 a digital currency address generated based on the public keys from sharing 221 and obtaining 222.

Figure 2C:
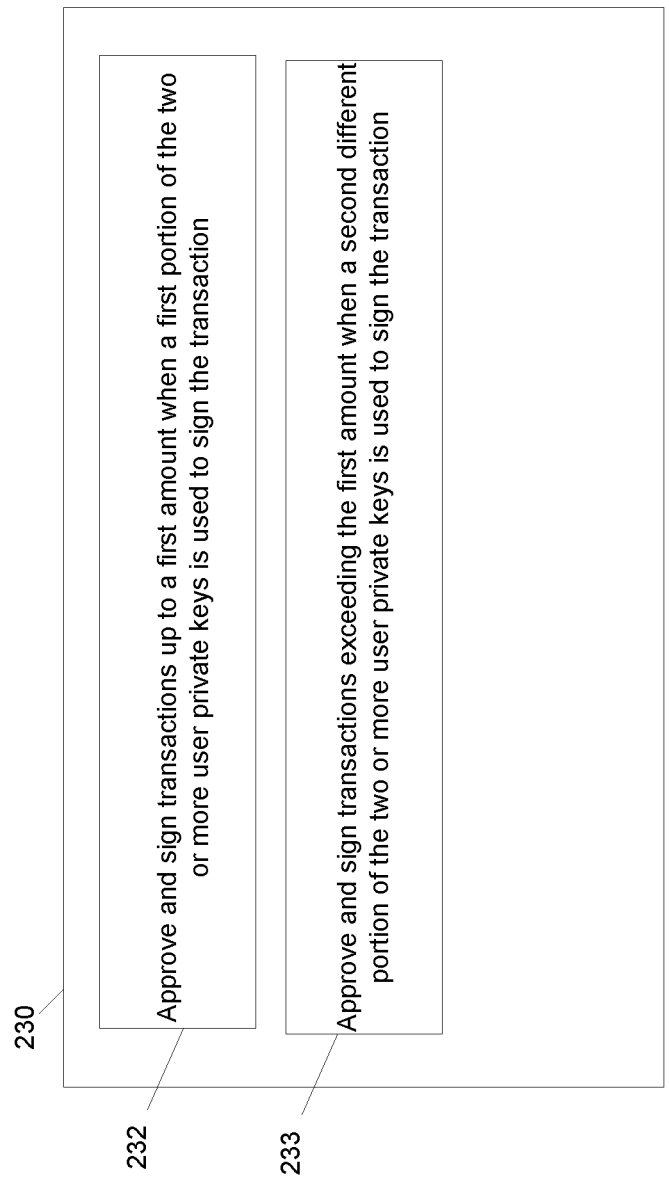
FIG. 2C illustrates an example transaction authorization configuration.

FIG. 2C illustrates an example transaction authorization configuration.

The example transaction authorization configuration 230 is for an example where the two or more second public-private key pairs may include at least three pairs (a backup key and two or more user private keys). The configuration 230 may include a first setting 232 and a second setting 233. In an example, the first portion associated with the first setting 232 may include a number N of the private keys, e.g. any one of the private keys, and the second portion associated with the second setting 232 may include more than the number N, e.g. more than one of the user private keys (for example all of the user private keys).

In other example transaction authorization configuration there may be more settings. For example, up to a first amount when a first portion is used to sign the transaction, exceeding the first amount and up to a second greater amount when a second portion is used to sign the transaction, exceeding the second greater amount when a third portion is used to sign the transaction, etc.

Figure 3A:
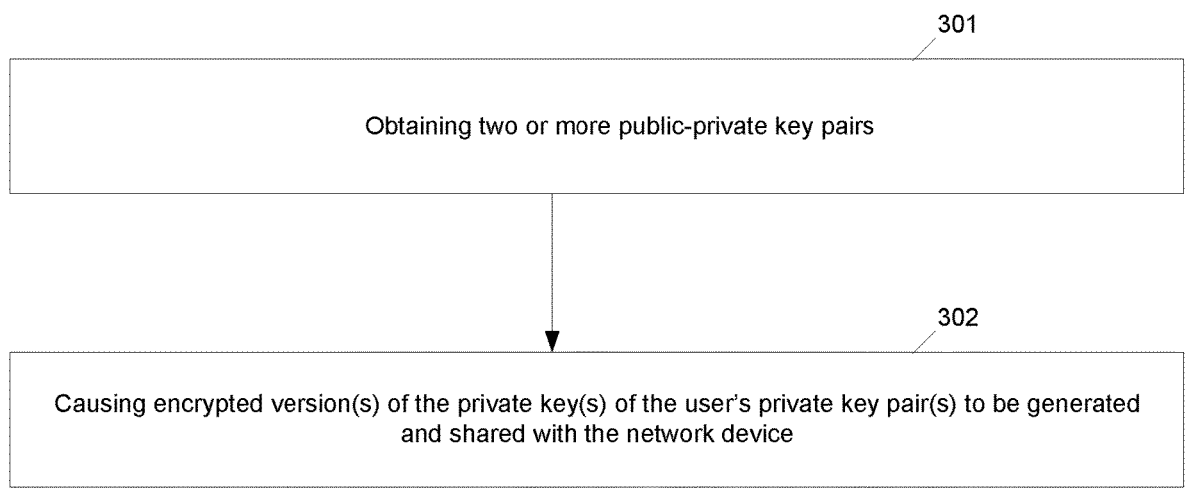
FIG. 3A illustrates a flow chart showing operation of processing device 11 of FIG. 1 to generate a digital currency address.

FIG. 3A illustrates a flow chart showing operation of processing device 11 of FIG. 1 to generate a digital currency address.

In block 301, processing device 11 may obtain two or more public-private key pairs. For example, processing device 11 may generate the two or more public-private key pairs. At least one of the public-private key pairs may be a backup key pair for fund recovery. The private key of the backup key pair is not shared with the network device 3, e.g. may be printed out and stored offline in, say, a safe deposit box. The remaining public-private key pair(s) of the two or more public-private key pairs may include the user's private key pair(s). Processing device 11 may be configured to cause an encrypted version(s) of the private key(s) of the user's private key pair(s) to be generated and shared with the network device 3 in block 302.

FIG. 3B illustrates the remote device causing selected keys to be shared with the network device.

The remote device 2 may cause the public key of the first public-private key pair to be received 320 by the network device 3. The public key may be sent from the remote device 2 or another device, or a combination thereof. The remote device 2 may cause the public keys of the two or more second public-private key pairs to be received 321 by the network device 3. The public keys may be sent from the remote device 2 or another device, or a combination thereof. The remote device 2 may cause a version(s), e.g. encrypted version(s), of the user private key(s) to be received 322 by the network device 3. The encrypted version(s) may be sent from the remote device 2 or another device, or a combination thereof. The remote device 2 does not share the private key of the backup key pair with the network device 3.

Figure 4:
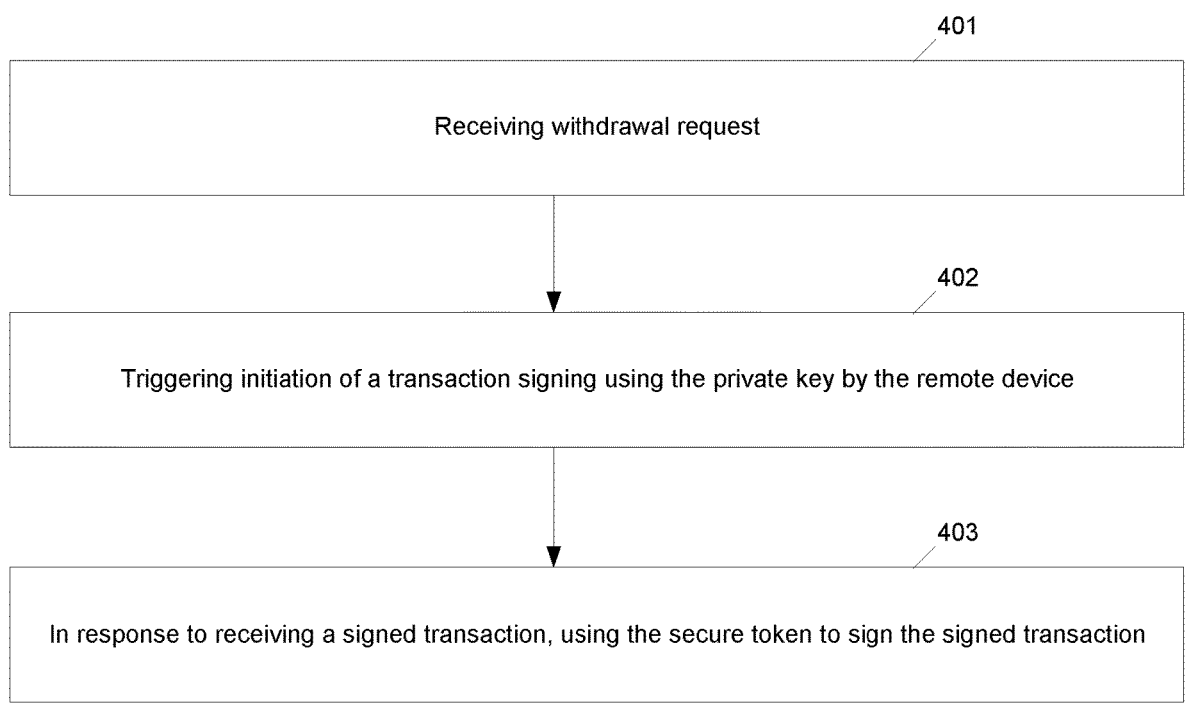
FIG. 4 illustrates a flow chart showing operating of processing device 12 of FIG. 1 to transfer funds from a digital currency account.

FIG. 4 illustrates a flow chart showing operating of processing device 12 of FIG. 1 to transfer funds from a digital currency account.

In block 401, processing device 12 may receive a fund transfer request, e.g. a withdrawal request. In an example, receiving the withdrawal request may involve a user logging on and/or authenticating with a service corresponding to the network device 3, and indicating a withdrawal. The processing device 12 may be configured to send a user of the remote device 2 an authentication challenge, e.g. a 2-factor authentication challenge. In an example, the processing device 12 may be configured to send the authentication challenge to a registered device corresponding to the user (for example smart phone or other mobile device), which may be a different device than the remote device 2. The processing device 12 may validate a response to the authentication challenge.

In block 402, processing device 12 may trigger initiation of a transaction signing using the private key. For example, processing device 12 may transmit over an electronic network the retained encrypted private key (the user's private key) to cause the user to be notified to enter the authentication criterion (in order to decrypt the encrypted version of the private key). In an example, the processing device 12 is configured to cause a notification to be displayed on the remote device for entering the authentication criterion. In an alternative example, processing device 12 may be configured to transmit a communication to cause the user to be notified to enter the authentication criterion in order to decrypt the encrypted version of the private key. The communication may not include the encrypted version of the private key, e.g. the user may provide the encrypted version of the private key and enter the authentication criterion in order to decrypt the same.

In an example, block 402 may be associated with decrypting the encrypted version of the private key using a secure token, providing the private key directly from the user, providing the private key of a local key storage device, e.g. a USB drive, a user typing in the key from a physical backup, e.g. a paper backup, or the like, or combinations thereof.

In block 403, processing device 12, in response to receiving a signed transaction, e.g. a remotely signed digital currency transaction, may use the secure token to sign the signed transaction.

Figure 5:
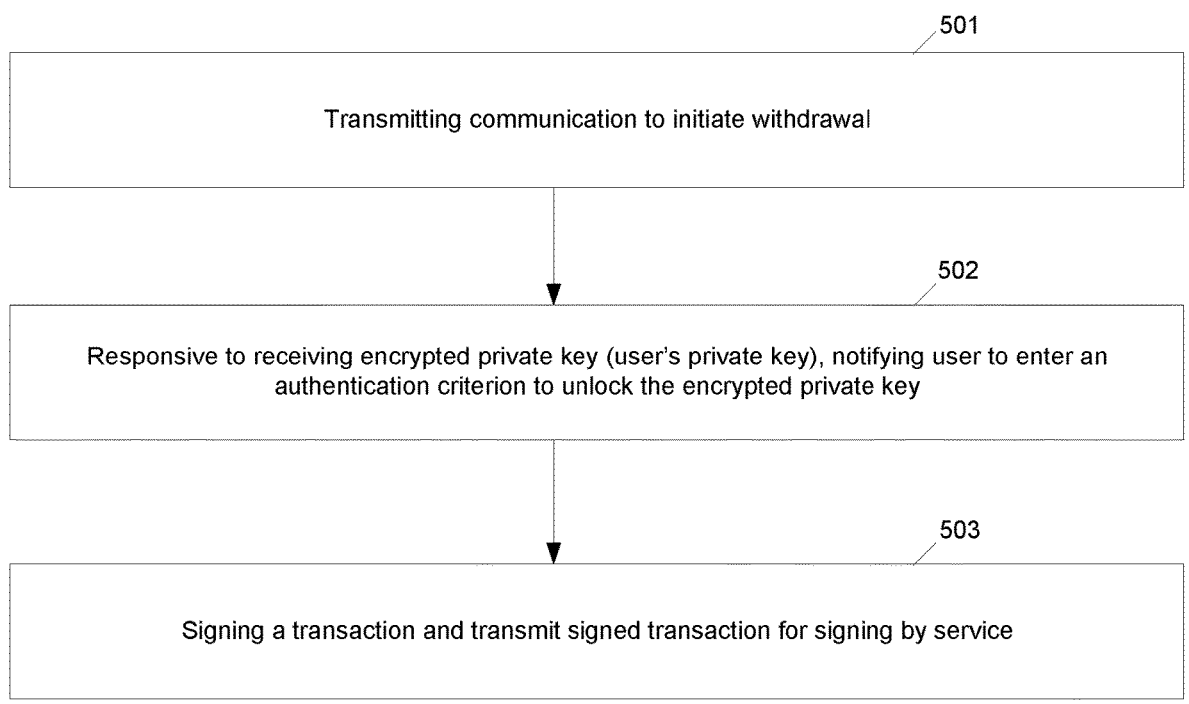
FIG. 5 illustrates a flow chart showing operating of processing device 11 of FIG. 1 to transfer funds from a digital currency account.

FIG. 5 illustrates a flow chart showing operating of processing device 11 of FIG. 1 to transfer funds from a digital currency account.

In block 501, processing device 11 may transmit a communication to initiate a transaction, e.g. a fund transfer, a withdrawal request, or the like. In block 502, processing device 11 may notify the user to enter the authentication criterion to unlock the encrypted private key.

In block 503, the processing device 11 may sign a transaction, e.g. a digital currency transaction, and may transmit the signed transaction for signing by the service. Signing the transaction by the processing device 11 may be associated with using a secure token, providing the private key directly from the user, providing a key of a local key storage device, e.g. a USB drive, an operator typing in a key, or the like, or combinations thereof. Signing by the service may be associated with accessing a stored key and signing with the stored key. Signing by the service may be associated with accessing a stored key, decrypting the stored key, and signing with the decrypted key.

Key Rotation

The processing device 12 may be configured to generate an additional digital currency address using only a subset of the public keys used to create the digital currency address. In an example, processing device 12 may be configured to obtain an additional third public-private key pair. The processing device 12 may be configured to transmit the public key of the additional third public-private key pair to the remote device 2. In an example, the public key is transmitted out of band with the communication path for withdrawal requests, for example by email, SMS, or the like.

The processing device 12 may be configured to generate an additional digital currency address using the public keys of the two or more second public-private key pairs and the public key of the additional third public-private key pair.

To an external observer, the additional digital currency address has no indicator that it is related to the original digital currency address. However, the backup key and the user's private key are usable with the additional digital currency address.

FIG. 6 illustrates key rotation. A first account number corresponding to a receiver's account is based on the following keys: k1, k2, k3. A second account number corresponding to a first sender's account is based on the following keys: k1, k2, k4, based on the principles described above. A third account number corresponding to a second sender's account is based on the following keys: k1, k2, k5, based on the principles described above.

Additional Privacy Via Mixing Originated Fund Contributions

The service, if appropriately funded, can further anonymize transactions by contributing funds into each transaction. The funds contributed by the service ultimately route back to the service.

Figure 7:
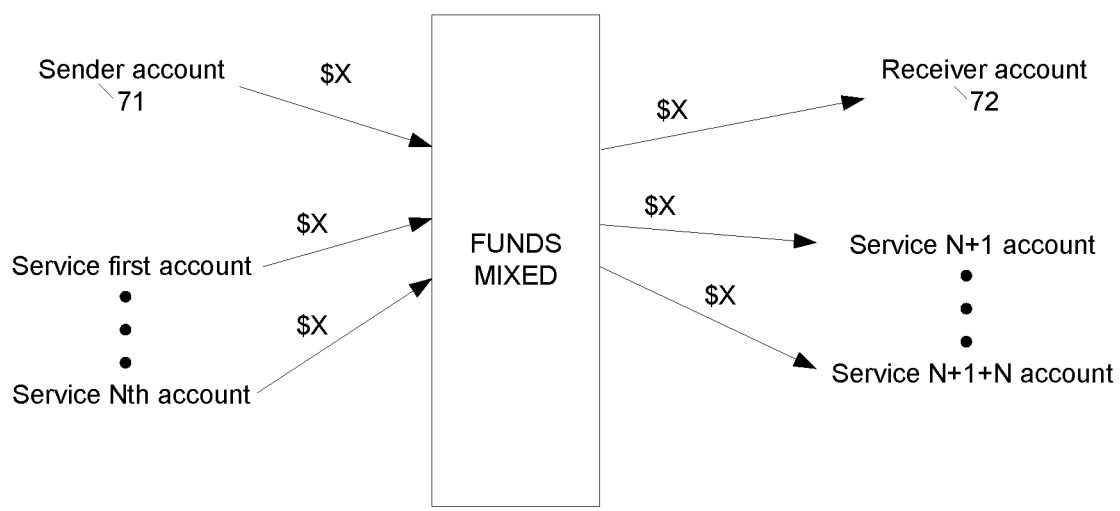
FIG. 7 illustrates fund contributions to provide additional security.

For example, a user of a first account (sender account 71 in FIG. 7) may wish to send funds to a second account of a different user (receiver account 72 in FIG. 7). The processing device 12 may be configured to generate a transaction having a first input corresponding to the first account, and having a plurality of additional second inputs corresponding to service accounts, and first output corresponding to the second account, and having a plurality of different second outputs.

As illustrated in FIG. 7, the generated transaction includes the $X from the first account, accompanied by the $X*N from the service accounts. The receiver corresponding to the second account is not able to correlate which account of all the accounts corresponds to the first user. In an example, N=10.

Offline Account Creation for a Third Party

The processing device 12 may generate a mapping of contact information to account information. In an example, the contact information may include an email address, a phone number, a social network identifier, a driver's license number, or the like.

The processing device 12 may enable a sender to transfer digital currency to a receiver. The processing device 12 may be configured to receive contact information corresponding to the receiver. The processing device 12 may be configured to determine account information corresponding to the contact information using the mapping. In an example, the account information includes the public keys corresponding to the backup key pair and the user private key pair(s) of the receiver.

The processing device 12 may be configured to cause an additional third public-private key pair to be generated responsive to receiving the request. The processing device 12 may be configured to transmit the public key of the additional third public-private key pair to the remote device 2. In an example, the public key is transmitted out of band with the communication path for withdrawal requests, for example by email, SMS, or the like.

The processing device 12 may be configured to generate an additional digital currency address using the public keys of the two or more second public-private key pairs and the public key of the additional third public-private key pair. The processing device 12 may be configured to utilize the additional digital currency address for the digital currency transfer from the sender to the receiver.

To an external observer, i.e. the sender, the additional digital currency address has no indicator that it is related to the digital currency address. However, the backup key and the user's private key(s) are usable with the additional digital currency address. The receiver can withdraw funds from the additional digital currency address using the previously discussed withdrawal request because the additional digital currency address is generated using the public keys corresponding to the receiver's backup key and user private key(s).

Also, the process described above does not require the receiver to be online in order to generate the additional digital currency address and transmit the public key of the additional third public-private key pair. Hence, the additional digital currency address can be created "offline".

Figure 8:
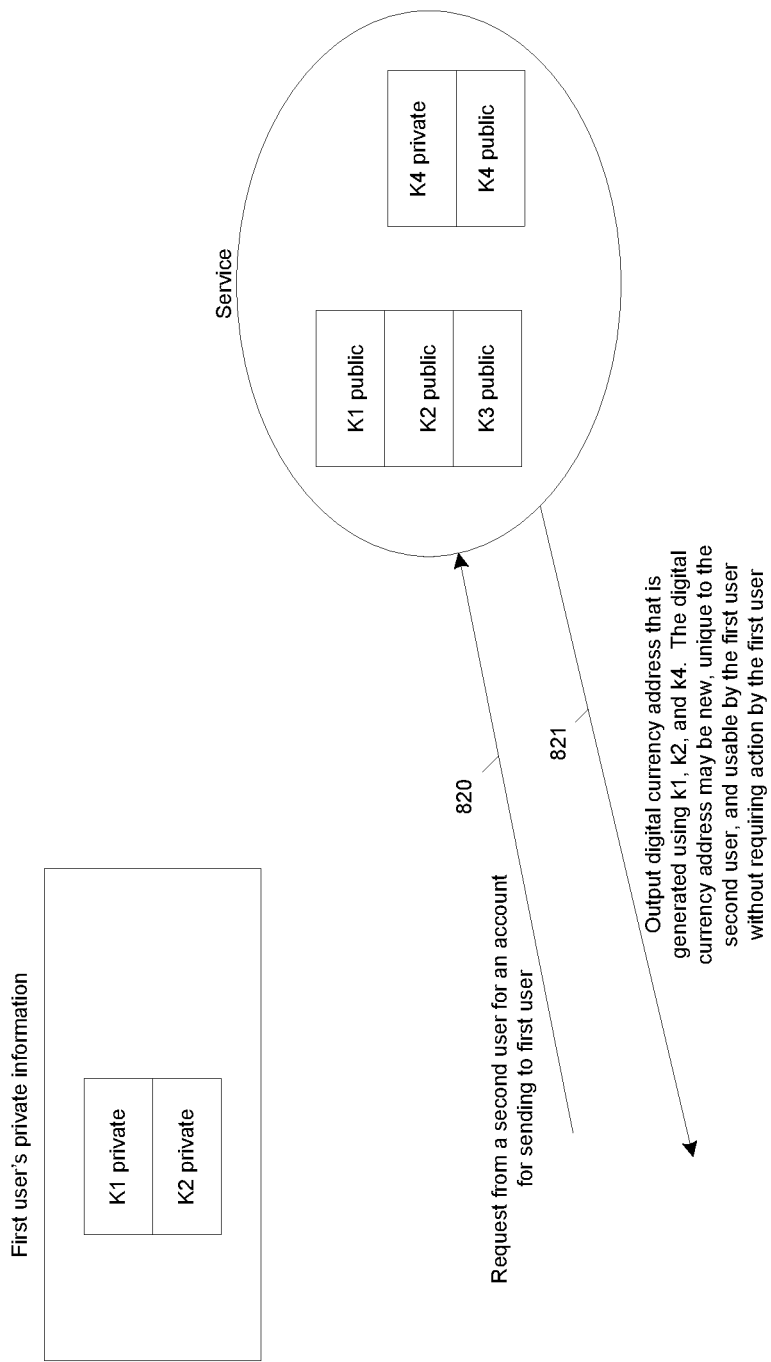
FIG. 8 illustrates offline account creation for a third party.

FIG. 8 illustrates offline account creation for a third party.

The service may receive a request 820 from a second user for an account for sending to a first user. The service may generate a digital currency address responsive to receiving the request. Generating the digital currency address may include obtaining a new key pair (k4), and generating the digital currency address using k1, k2, and k4 (public keys). The service may output 821 the generated digital currency address, e.g. send the generated digital currency address to the first user, and e.g. send the generated digital currency address out of band. The digital currency address may be new, unique to the second user, and provided to the first user without requiring the first user to log into the service.

Account Recovery without the Service Provider

In an example involving offline account creation for a third party, the processing device 12 may be configured to deliver the public key corresponding to the additional third public-private key pair out of band with respect to the communication channel the receiver used to establish the original digital currency account. For example, the public key can be transmitted to the receiver via SMS, email, or the like. The receiver can retain the public key for use when recovering funds outside the service.

In another example, the processing device 12 may be configured to embed the public key in the transaction itself. Transactions can include a metadata field. The processing device 12 may be configured to insert the public key in the metadata field. In an example, the processing device 12 may be configured to encrypt the public key with a secure token corresponding to the receiver for additional security. The processing device 12 may be configured to notify the receiver out of band that the transaction occurred (so that the receiver will know to go look for the transaction in the peer to peer network).

In an example in which the digital currency corresponds to Bitcoin, the processing device 12 may be configured to insert data corresponding to the public key into a Bitcoin script of a transaction output. Bitcoin scripts are used to validate that the next person going to use the funds has permission to do so.

The data can be encoded into the script without affecting the result of running the script. Scripts may be simple commands run in a stack-like fashion with push/pop (similar to reverse-polish-notation on an HP® brand calculator).

An example of a script is as follows:
OP_DUP OP_HASH160 OP_PUSHDATA(pubKeyHash) OP_EQUALVERIFY OP_CHECKSIG.

When the receiver goes to unlock the funds, the receiver will provide a signature and a public key, so a full script becomes:

OP_PUSHDATA(signature) OP_PUSHDATA(pubKey) OP_DUP OP_HASH160
OP_PUSHDATA(pubKeyHash) OP_EQUALVERIFY OP_CHECKSIG.

Running the above script returns the value TRUE to unlock the funds. The processing device 12 may be configured to modify the script to embed data and yet still remain TRUE when run for unlocking. For example:
OP_PUSHDATA(message) OP_DROP OP_DUP OP_HASH160 OP_PUSHDATA(pubKeyHash) OP_EQUALVERIFY OP_CHECKSIG.

(bold added for emphasis)

The OP_PUSH/OP_DROP sequence does not prevent the script from resulting in TRUE, and therefore can be used by the processing device 12 to encoded metadata.

It will be obvious to those having skill in the art that many changes may be made to the details of the above-described embodiments without departing from the underlying principles of the invention. The scope of the present invention should, therefore, be determined only by the following claims.

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in an example embodiment thereof, it should be apparent that the invention may be modified in arrangement and detail without departing from such principles. We claim all modifications and variations coming within the spirit and scope of the following claims.

The invention claimed is:

1. A server, comprising:
a processor; and
a memory having instructions stored thereon that, in response to execution by the processor, cause the server to perform operations comprising:
generating, by the processor, a first public-private key pair;
obtaining, from a network communication received over an electronic network, public keys of two or more second public-private key pairs;
generating an address using a script with parameters including:
the public keys of the two or more second public-private key pairs and a public key of the first public-private key pair;
a value representing a minimum (M) number of signatures required; and
a value representing a total number (N) of valid keys; and
wherein the server is arranged to, after the address generation:
upon request for a transaction associated with the address, authenticate user(s) requesting the transaction and check whether the requested transaction has been signed, remotely, by at least one private key of a plurality of private keys of the two or more second public-private key pairs;
check the transaction to identify which portion of the plurality of private keys of the two or more second public-private key pairs was used to sign transaction;
identify one user preference setting of plural user preferences settings based a result of the check; and
sign the transaction using a private key of the first public-private key pair if one or more characteristics of the transaction coincide with condition(s) corresponding to the user preference setting.

2. The server of claim 1, wherein the operations further comprise:
receiving, by the processor and over the electronic network, information about only a subset of private keys of the plurality of private keys, wherein said received information comprises an encryption of at least one private key of the plurality of private keys, and wherein said encryption is generated remotely using an authentication object;
retaining, by the processor, the information about the encryption for retrieval in response to the request for the transaction associated with the address, wherein the retained information comprises the encryption; and
in response to receiving the request for the transaction associated with the address, transmitting, by the processor, the retained encryption over the electronic network for remote decryption using the authentication object.

3. The server of claim 1, wherein the operations further comprise:
receiving, by the processor and over the electronic network, information about only a subset of private keys of the plurality of private keys, wherein the information is based on a remote encryption of at least one private key of the plurality of private keys using an authentication object; and
retaining, by the processor, said received information for retrieval in response to the request for the transaction associated with the address;
in response to receiving the request for the transaction associated with the address, generating, by the processor, a request based on the retained information, the request for remote decryption of the encryption using the authentication object; and
transmitting, by the processor, the request over the electronic network.

4. The server of claim 1, wherein generating the address using the script with said parameters further comprises:
inputting the public keys of the two or more second public-private key pairs and the public key of the first public-private key pair into P2SH (pay to script hash).

5. The server of claim 1, wherein the operations further comprise:
encrypting, by the processor, the private key of the first public-private key pair using a secure token; and
in response to receiving an additional network communication indicating remote signing of the transaction associated with the address, signing, by the processor, the transaction using the secure token.

6. The server of claim 1, wherein the operations further comprise:
generating an additional third public-private key pair; and
generating an additional address using the script with parameters including:
the public keys of the two or more second public-private key pairs and the public key of the additional third public-private key pair;
the value representing the minimum (M) number of signatures required; and
the value representing the total number (N) of valid keys;
wherein at least one private key of the plurality of private keys is usable with the additional address.

7. The server of claim 6, wherein the operations further comprise:
wherein the address corresponds to a first entity;
identifying, by the processor, a request for a third party deposit that is associated with a second entity that is different than the first entity; and
generating, by the processor, the additional third public-private key pair responsive to receiving the request for the third party deposit;
wherein the additional address is usable for a transaction corresponding to the third party deposit.

8. The server of claim 7, wherein the operations further comprise sharing the public key of the additional third public-private key pair with a remote device associated with the first entity.

9. The server of claim 8, wherein the operations further comprise:
performing communications with the first entity over a first communication path, including:

receiving, by the processor and over the electronic network, information about only a subset of private keys of the plurality of private keys, wherein said received information comprises an encryption of at least one private key of the plurality of private keys, and wherein said encryption is generated remotely using an authentication object;

retaining, by the processor, the information about the encryption for retrieval in response to the request for the transaction associated with the address, wherein the retained information comprises the encryption; and in response to receiving the request for the transaction associated with the address, transmitting, by the processor, the retained encryption over the electronic network;

wherein said sharing the public key of the additional third public-private key pair with the remote device associated with the first entity is over a second communication path that is out of band with respect to the first communication path.

10. The server of claim 8, wherein the operations further comprise:

receiving, by the processor and over the electronic network, information about only a subset of private keys of the plurality of private keys, wherein said received information comprises an encryption of at least one private key of the plurality of private keys, and wherein said encryption is generated remotely using an authentication object;

retaining, by the processor, the information about the encryption, wherein the retained information comprises the encryption;

in response to receiving the request for the transaction associated with the address, transmitting, by the processor, the retained encryption over the electronic network;

encrypting, by the processor, the private key of the first public-private key pair using a secure token; and in response to receiving an additional network communication indicating remote signing of the transaction, signing, by the processor, the transaction using the secure token;

wherein said sharing of the public key of the additional third public-private key pair is by inserting said public key into a meta data field associated with the transaction.

11. The server of claim 1, wherein the operations further comprise:

obtaining the request for the transaction from an additional network communication.

12. The server of claim 11, wherein the network communication and the additional network communication comprise a communication from a client and an additional communication from a client, respectively.

13. A server, comprising:
a processor; and
a memory having instructions stored thereon that, in response to execution by the processor, cause the server to perform operations comprising:
generating an address using a script with parameters including:
a public key of a first public-private key pair and public keys of two or more second public-private key pairs;
a value representing a minimum (M) number of signatures required; and
a value representing a total number (N) of valid keys; and
managing the address including managing a private key of the first public-private key pair following address generation;
wherein the server is arranged to, after the address generation:
upon request for a transaction associated with the address, authenticate user(s) requesting the transaction and check whether the requested transaction has been signed, remotely, by at least one private key of the two or more second public-private key pairs;
check the transaction to identify which portion of a plurality of private keys of the two or more second public-private key pairs was used to sign transaction;
identify one user preference setting of plural user preferences settings based a result of the check; and
sign the transaction using the private key of the first public-private key pair if one or more characteristics of the transaction coincide with condition(s) corresponding to the user preference setting.

14. The server of claim 13, wherein the operations further comprise:

receiving, by the processor and over the electronic network, information about only a subset of private keys of the plurality of private keys, wherein said received information comprises an encryption of at least one private key of the plurality of private keys, and wherein said encryption is generated remotely using an authentication object;

retaining, by the processor, the information about the encryption for retrieval in response to the request for the transaction associated with the address, wherein the retained information comprises the encryption; and in response to receiving the request for the transaction associated with the address, transmitting, by the processor, the retained encryption over the electronic network for remote decryption using the authentication object.

15. The server of claim 13, wherein the operations further comprise:

receiving, by the processor and over the electronic network, information about only a subset of private keys of the plurality of private keys, wherein the information is based on a remote encryption of at least one private key of the plurality of private keys using an authentication object; and retaining, by the processor, said received information for retrieval in response to the request for the transaction associated with the address;

in response to receiving the request for the transaction associated with the address, generating, by the processor, a request based on the retained information, the request for remote decryption of the encryption using the authentication object; and transmitting, by the processor, the request over the electronic network.

16. The server of claim 13, wherein generating the address using the script with said parameters further comprises:

inputting the public keys of the two or more second public-private key pairs and the public key of the first public-private key pair into P2SH (pay to script hash).

17. The server of claim 13, wherein the operations further comprise:

encrypting, by the processor, the private key of the first public-private key pair using a secure token; and in response to receiving an additional network communication indicating remote signing of the transaction associated with the address, signing, by the processor, the transaction using the secure token.

18. The server of claim 13, wherein the operations further comprise:
generating an additional third public-private key pair; and
generating an additional address using the script with parameters including:
the public keys of the two or more second public-private key pairs and the public key of the additional third public-private key pair;
the value representing the minimum (M) number of signatures required; and
the value representing the total number (N) of valid keys;
wherein at least one private key of the plurality of private keys is usable with the additional address.

19. The server of claim 18, wherein the operations further comprise:
wherein the address corresponds to a first entity;
identifying, by the processor, a request for a third party deposit that is associated with a second entity that is different than the first entity; and
generating, by the processor, the additional third public-private key pair responsive to receiving the request for the third party deposit;
wherein the additional address is usable for a transaction corresponding to the third party deposit.

20. The server of claim 19, wherein the operations further comprise sharing the public key of the additional third public-private key pair with a remote device associated with the first entity.

* * * * *